Aug. 2, 1966  C. N. SJOGREN  3,263,336
METHOD AND APPARATUS FOR DRYING FOAM
Filed Nov. 23, 1962  3 Sheets-Sheet 1
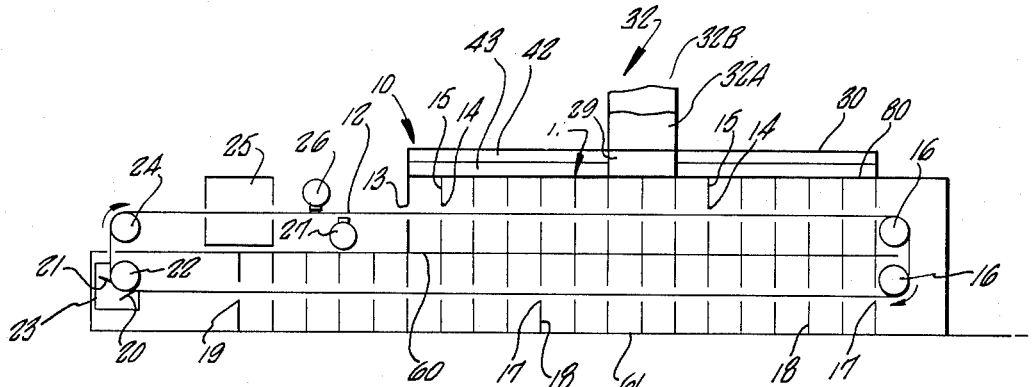
FIG. 1
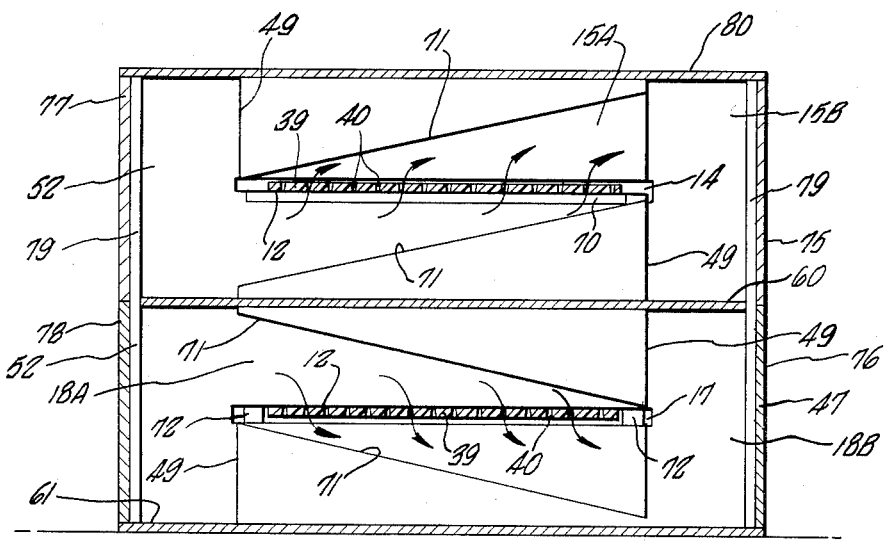
FIG. 3
FIG. 4
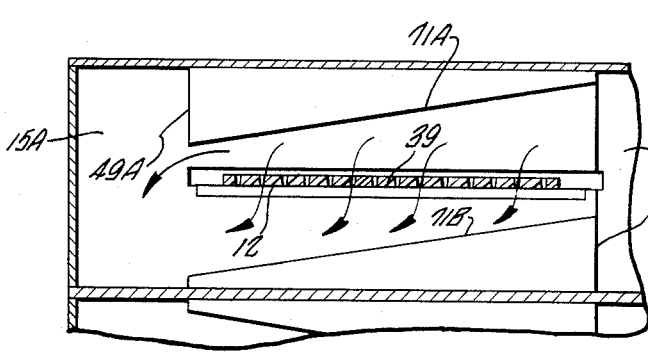
INVENTOR.
CHARLES NORMAN SJOGREN
BY
Christie, Parker & Hale
ATTORNEYS.

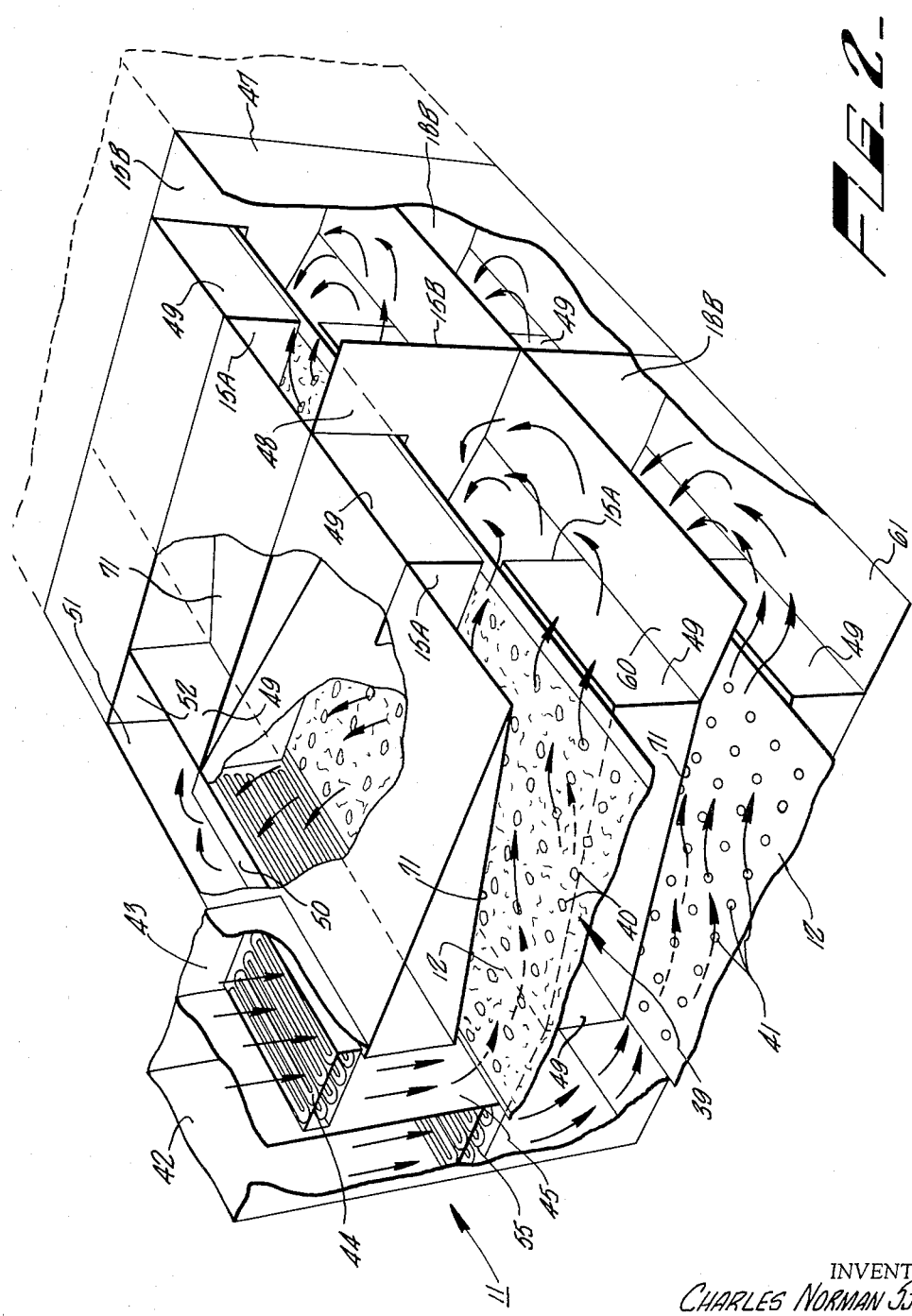

Aug. 2, 1966  C. N. SJOGREN  3,263,336
METHOD AND APPARATUS FOR DRYING FOAM
Filed Nov. 23, 1962  3 Sheets-Sheet 3

INVENTOR.
CHARLES NORMAN SJOGREN
BY
Christie Parker & Hale
ATTORNEYS.

United States Patent Office 3,263,336
Patented August 2, 1966

3,263,336
METHOD AND APPARATUS FOR DRYING FOAM
Charles Norman Sjogren, San Gabriel, Calif., assignor to Chemet Enterprises, Pasadena, Calif., a limited partnership
Filed Nov. 23, 1962, Ser. No. 239,527
12 Claims. (Cl. 34—23)

This invention relates to improvements in the dehydration of foams, particularly of the type known as "foam-mat" drying.

Processes for the dehydration of foams have been known for some time. Examples of such processes are given in U.S. Patent No. 2,981,629 issued April 25, 1961, and in my co-pending application Serial No. 164,897 filed January 8, 1962. In Patent No. 2,981,629, there is shown an apparatus for drying foam deposited upon a continuous belt. The belt has a series of perforations through which air is blown so as to form perforations, or craters, in the foam. The dehydrating medium then passes through these craters and through the perforations in the belt to accomplish dehydration. The device illustrated in U.S. Patent No. 2,981,629, while theoretically feasible, has not proved to be of sufficient practicality to be commercially acceptable. A commercially practical apparatus and method accomplishing dehydration of foam is illustrated in my aforesaid co-pending application. In this application, rather than utilizing a continuous belt, the dehydration operation is accomplished by utilizing a series of trays, onto which the foam is deposited. The trays are then carried into a drying chamber, where dehydration is accomplished. Thus, continuous operation is accomplished through a sequence of discontinuous steps. However, the apparatus required in the practice of the invention in my aforesaid application is both complex and expensive. In the present invention, the advantages of continuous belt operations are combined with the advantages of dehydration fluid temperature control and direction of flow control provided in my aforesaid application.

According to the invention, in its apparatus aspects, a continuous belt is driven past a foam spreader which applies the foam to be dehydrated upon the belt. The belt has perforations extending therethrough, through which a cratering fluid is passed to form the craters required in dehydration. The belt carrying the cratered foam then passes into a dehydration chamber, which consists of a large number of separate drying chambers. The drying chambers are adapted to cause the dehydration fluid to pass through the craters and belt perforations while moving substantially normal to the direction of movement of the belt and foam. A plurality of dehydration zones are provided to accomplish the necessary temperature control for the dehydrating medium. A unique structure is provided for each dehydration chamber, so that accurate and precise control is obtained over the velocity and temperature of dehydrating medium passing through and across the foam, the direction of passage through the foam, as well as over-all flow. It has been found that the foam, after the initial drying has been accomplished, will adhere to the belt against the force of gravity. Therefore, after the initial partial dehydration of the foam has been accomplished, the belt passes around a roller or the like, so that the foam previously supported on the belt is now suspended from the belt when in its return or lower disposition. The dehydration of the foam continues while the foam is in this lower disposition. The foam is finally removed from the belt by conventional means, such as a doctor blade. After the foam has been removed, the belt can be cleaned as necessary, for example, by washing and drying, and foam is again deposited thereon.

In its method aspects, the invention consists of depositing foam on the upper surface of a moving perforated continuous belt, forming craters in the foam, dehydrating the foam by passage of a dehydrating medium through the craters and across the foam at an angle substantially normal to the direction of belt movement initially while the foam is supported on the belt and subsequently while the foam is suspended from the belt, and removing the dried foam from the belt.

The term "across" as used in the description refers to the path or course of a drying medium over the width of a belt which has length, width, and thickness.

The invention may be more readily understood by referring to the accompanying drawings in which:

FIGURE 1 is a schematic view of a dryer according to the invention;

FIGURE 2 is an isometric view of a portion of the dryer of FIGURE 1;

FIGURE 3 is a sectional view of a portion of a dryer of FIGURE 1;

FIGURE 4 is a sectional view of an alternate embodiment of FIGURE 1;

Figure 5:
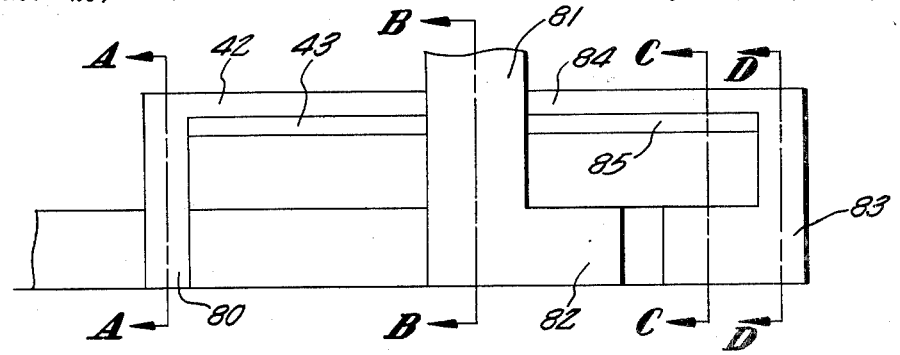
FIGURE 5 is a schematic view of the drying medium distribution system of the dryer of FIGURE 1.

Referring now to FIGURE 1, there is shown in section a schematic view of the preferred embodiment of foam-mat dryer according to the invention. In FIGURE 1, a dryer 10 includes a drying assembly 11 through which a continuous belt 12 passes. The belt 12 enters the assembly 11 at an aperture 13 and passes through a plurality of apertures 14 formed in the upper dryer chamber walls 15 and around a pair of rollers 16. After passing around the roller 16, the belt 12 passes through a plurality of apertures 17 formed in lower dryer chamber walls 18 and through a dryer chamber outlet aperture 19. A pair of doctor blades 20 and 21 are held (by means not shown) against the belt 12 as it passes around a foam removal roller 22. Foam removal means, shown schematically as an enclosed pneumatic conveyor 23 which utilizes air velocity to gather the foam removed from the belt 12 by the doctor blades 20, 21 and transport the foam to the next processing stage. The belt 12 then passes over a drive roller 24 and into belt washing and drying means 25. The belt washing and drying means 25 cleans the belt of any foam remaining and prepares the belt for an application of a fresh layer of foam. A foam applicator 26 continuously applies a layer of foam to the belt and crater-forming blower 27 passes a crater-forming fluid, usually air, through perforations formed in the belt, so as to form the necessary craters in the foam. It will be noted that the crater-forming fluid is applied from the undersurface of the belt so as to force the foam upwardly from the belt perforations, rather than through the belt perforations.

Disposed on top of the dryer 11 is a drying medium distribution system consisting of a blower 29, two pairs of drying medium supply ducts 30, 31, inlet 32A, and exhaust 32B. For the purposes of this explanation, it will be assumed that, in the following description, the dehydration fluid utilized is air, it being understood that various other fluids might be utilized, as is well known.

In FIGURE 2, there is shown in section a portion of the dryer 11 adjacent the inlet aperture 13. A layer of foam 39 has craters 40 formed therein at perforations 41 in the belt 12. The perforations and craters are shown only schematically, due to their large number and small size in actual practice. For example, perforations one-eighth inch in diameter drilled on three-sixteenth inch centers in a stainless steel sheet of twenty-five thousandths inch thickness are satisfactory. The duct 31 is seen to consist of a first drying medium supply duct 42 and a second drying medium duct 43. Both ducts are fed from the supply means 32. Air contained in the second supply duct 43 passes through a first heater element 44 which raises the air to the temperature desired in the initial dehydration of the foam. The air then passes downwardly through an inlet supply duct 45 to the underside of the belt 12. The heating air passes upwardly through the perforations formed in the belt and the craters in the foam, while moving generally across the belt at approximately 90° to the direction of movement of the belt. This direction of flow is shown by arrows. After passing through the belt and craters in the foam, the direction of flow of the air is changed by a sidewall 47 (shown as partially broken away) so as to flow generally in the direction of the belt. The moving air then comes against a baffle plate 48 which directs the flow of air again in a direction at right angle to the movement of the belt, but now in a reverse direction to the initial direction of flow. A baffle plate 49 substantially isolates the air flow from the upper surface of the belt, so that the air must once again flow under the belt and through the belt perforations and foam craters. Upon leaving the vicinity of the foam, the air then passes through a second heater element 50 and its direction is again reversed by means of a back wall 51, similar to the wall 47, and a baffle plate 52 similar to the baffle plate 48. Thus, it will be seen that the chamber walls 15 are similar but opposite in orientation, forming two sets of walls 15A and 15B.

The upper dryer chambers are separated from the lower dryer chambers by a center plate 60 and the entire apparatus rests on a base plate or floor 61. In the lower dryer portion, a similar flow path is formed for heating air entering from the first duct 42 and passing through a third heater element 55. However, it will be noted that, as shown, the flow of heated air in the lower dryer sections is initially against the drying foam rather than through the belt, so as to provide better contact between the foam and air.

FIGURE 3 is a sectional view of the dryer more clearly showing the relationship of the belt 12, foam 39 and chamber walls 15 and 18. In FIGURE 3, it will be seen that the belt 12 in the upper chamber is supported upon a continuous guide plate 70 attached to the chamber wall 15. Various other methods of supporting the belt can be utilized, but this continuous support also serves the purpose of reducing air leakage between zones of dehydration utilizing different flows rates and temperature levels of the dehydrating medium, which will be discussed with reference to FIGURES 5 and 6. Attached to baffle plates 49 in both the upper and lower chambers are air deflector plates 71. It will be seen that the pair of air deflector plates 71 in each chamber provides a flow path for the dehydrating fluid as it passes through the belt 12 and foam craters 40. The deflector plates on the inlet side in each case act to constrict the flow of drying medium as it travels across the belt and passes through the belt and foam. In the lower drying chamber, a pair of guide plates 72 support the belt on the edges thereof.

The direction of air flow in FIGURE 3 is slightly different from that shown in FIGURE 2. It will be noted that, in FIGURE 3, the air flow in the lower drying chamber passes through the belt 12 before contacting the foam 39. Such a flow path may be accomplished by reversing the relative orientation of the deflector plates 71 and baffle plates 49 from that shown in FIGURE 2. Alternatively, of course, such a change can be accomplished by changing the point of the flow path at which the drying medium is introduced. Thus, a reversal of the direction of drying medium flow from that shown in FIGURE 2 can accomplish the same result without necessitating a change in the orientation of the deflector plates 71 and baffle plates 49, although such a reversal is not too practical in actual operation, due to the changes required in supply ducting. The deflector plates 71 and baffle plates 49 are attached to the dryer by means of any conventional means, so as to readily changed when necessary or desired for the particular type of drying in process. Preferably, such a change is accomplished by pivoting the deflector plates 71 rather than removing them completely, although either system can be used. Access to the deflector plates 71 and baffle plates 49 may be had through side panels 75, 76, 77 and 78, which are removable from the dryer. The center plate 60 is supported from the base plate 61 by supports 79 which comprise a steel frame, to which the side panels 75, 76, 77 and 78 are attached. Preferably, the panels 75, 76, 77, 78 are insulating, in order to reduce heat losses. The supports 79 also support a top plate 80, over which is disposed the drying medium distribution system (not shown, see FIGURE 1).

In FIGURE 4, there is shown an alternate arrangement of baffle plates and deflector plates. In this embodiment, control of air transfer is provided by a first baffle and deflector plate arrangement 49A and 71A, and a second baffle and deflector plate arrangement 49B and 71B. The air flow has been selected to be downward against the foam rather than upward through the belt. The space provided between the baffle plate 49A and the belt 12 is also sufficient to permit a portion of the drying medium to pass therethrough, rather than requiring all of the drying medium to pass through the craters 40 in the foam, as in the previously described embodiments. The embodiment of FIGURE 4 will prove to be more advantageous than either embodiment shown in FIGURE 3 in accomplishing satisfactory drying where greater crossflow movement of the drying medium is desirable.

In the foregoing description, the various components of the mechanism of the present invention have been described. It will be apparent that the control of the direction of flow of the drying medium may be readily accomplished in either one of a number of ways. During certain portions of the drying of the foam, it will be preferable to move the drying medium in the same over-all direction as the belt, it being understood that movement of the drying medium through and across the belt is utilized in the actual drying. Thus, in FIGURE 2, the drying medium, while moving back and forth across the belt, also moves in the same direction as the belt in the upper drying portion, while moving in the opposite direction as the belt in the lower portion. The speed at which the belt passes through the dryer is, of course, controlled by the rate of rotation of the drive roller 24. This speed is selected, with respect to the particular foam being dried and the properties of the product desired, so as to utilize appropriate air temperatures to accomplish drying. By utilizing dampers and additional inlets and outlets, it will be apparent that the point of entry of the drying medium at any portion of the dryer can be readily controlled. By changing baffle and deflector plates, the ratio of drying medium passing through the craters to that passing across the foam can be controlled, while direction of the passage of the drying medium may be controlled by orientation of the baffle and deflector plates. The use of intermediate stage heaters provides the necessary control of drying medium temperature.

In the preceding description, it has been pointed out that the foam is applied to the belt and passes through an upper drying section, around a pair of rollers, and through a lower drying section of the dryer. It should be noted that these rollers are selected to have a diameter sufficient to prevent the foam from being dislodged from the belt, as distinguished from the teaching of U.S. Patent No. 2,981,629, in which the rollers are selected to accomplish dislodging. The actual drying consists of three general steps, an initial drying step, a secondary drying step and a cooling step. In the initial drying step, the foam has a high moisture content, and so relatively high flow rates of the drying medium heated to comparatively high temperatures can safely be used without damaging the foam. Also, in this initial drying step, the flow of the drying medium can be generally co-current with the movement of the belt, thus enabling the highest temperature to be applied at the initial point of drying. It has been found that, in utilizing the present invention, about eighty percent of the total moisture will be removed during the first twenty percent of the travel of the foam through the dryer, when a high drying medium temperature and co-current flow are utilized, it being understood that the co-current flow referred to contemplates movement of the drying medium across and through the perforated belt and the foam and refers to the over-all longitudinal direction of the movement of the medium relative to the belt movement.

After the initial drying step, during which the foam moisture content has been greatly reduced, it is necessary to use reduced flow rates of drying medium at lower temperatures in order to avoid damaging the foam. In these steps, the use of counter-current flow is often advantageous, in order to provide the optimum temperature profile in the dryer to further appreciably reduce moisture content. The term "counter-current," of course, also contemplates the use of a flow of the drying medium across and through the perforated belt and foam and refers to the over-all longitudinal direction of drying medium movement relative to the belt travel. Therefore, the second step advantageously utilizes counter-current flow for the drying medium, at least, for a large part. As will be subsequently explained, the dryer of the present invention may utilize either co-current or counter-current flow, as appropriate, in certain portions of the dryer accomplishing the second drying step.

The third step in the drying of the foam is the cooling step, in which, preferably, the cooling medium, such as air, moves in counter-current flow. Such a counter-current movement provides the lowest temperature cooling medium adjacent the exit of the belt from the dryer, with a gradually increasing temperature downstream.

It will be noted that the three steps and the three over-all directions of movement just described are also illustrated in U.S. Patent No. 2,981,629, with the exception that the aforesaid patent does not teach the movement of the drying medium across and through the perforated belt and foam. For this reason, the drying provided in following the teaching of the aforesaid patent has never been commercially satisfactory, sufficient uniformity of drying action not being provided by simple co-current or counter-current flow. In addition, in the aforesaid patent, it was not appreciated that the return movement of the belt can be utilized for the completion of drying and cooling, since it was not recognized that the foam would adhere to the flat belt after the initial and a part of the second drying steps were completed.

Referring now to FIGURE 5, there is shown a schematic of the system for the distribution of drying medium in the dryer of FIGURE 1. The first or initial drying steps utilize co-current flow. The medium for the initial drying step is applied to the dryer through the supply duct 43, as was pointed out with respect to FIGURE 2. In the actual practice of the invention utilizing the dryer of FIGURE 1, the second drying step is divided into three separate portions, the first and third utilizing counter-current flow and the second utilizing either co-current or counter-current flow, as desired. The drying medium for the third portion of the second drying step is applied to the dryer through the supply duct 42, which connects to a downwardly extending duct extension 80, as shown in FIGURE 5, and terminates at the lower portion of the dryer. The drying medium is exhausted from the dryer at the central portion thereof at an exhaust duct 81, which has a lateral extension 82 extending away from the inlet end of the dryer. Opposite the inlet end of the dryer, there is disposed a duct 83 that extends to the base or floor and returns for some distance toward the inlet end of the dryer which is utilized in the second portion of the second drying step to control the application of the drying medium as co-current or counter-current flow. The duct 83 is supplied through a third drying medium supply duct 84 connected to the supply means 32. Also connected to the supply means 32 is a fourth supply duct 85, which supplies drying medium for the first portion of the second drying step in counter-current flow. The actual control for the point at which the duct 83 applies drying medium to a dryer is controlled by dampers or the like. Similarly, dampers are utilized with the exhaust duct extension 82 to control the position at which drying medium is exhausted from the second and third portions of the second drying step. The arrangements of the ducts and dampers are more clearly shown in FIGURES 6A through 6D, which are sectional views taken along their respective section lines of FIGURE 5, the belts and baffles not being shown in these figures for purposes of clarity.

Figure 6A:
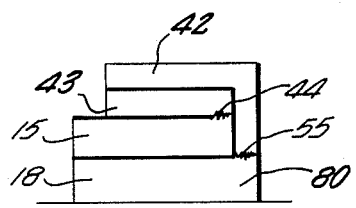
FIGURE 6A is a sectional view taken along lines A—A of FIGURE 5.
Figure 6C:
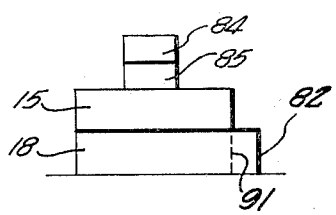
FIGURE 6C is a sectional view taken along lines C—C of FIGURE 5.
Figure 6B:
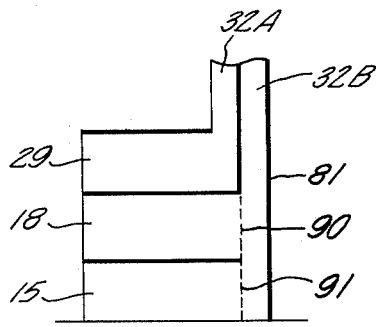
FIGURE 6B is a sectional view taken along lines B—B of FIGURE 5.

FIGURE 6A is a sectional view taken along lines A—A of FIGURE 5 and illustrates a view of the dryer similar to that shown in FIGURE 2. FIGURE 6A will be useful for orientation with respect to FIGURES 6B, 6C and 6D. In FIGURE 6B, there is shown a sectional view of the dryer taken along lines B—B of FIGURE 5 and illustrating the exhaust duct arrangement. It will be noted that exhaust drying medium is removed from the upper drying chamber through a damper 90 and from the lower drying chamber through a damper 91. The duct 81 is of a width sufficient to cover several adjacent chambers, allowing the selection of any two thus enclosed longitudinally aligned drying chambers, to simultaneously exhaust the co-current flow of the first drying step and the counter-current flow from the second drying step. The duct extension 82 is connected to lower drying chambers through similar dampers, so as to provide flexibility in selecting the point at which the drying mediums utilized in the second and third drying steps are removed as is shown in FIGURE 6C.

Figure 6D:
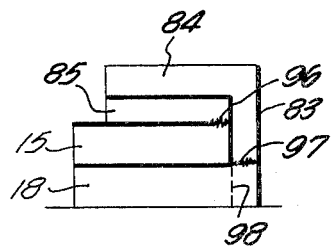
FIGURE 6D is a sectional view taken along lines D—D of FIGURE 5.

In FIGURE 6D, there is shown the duct arrangement for applying the drying medium utilized in the first and second portions of the second drying step. The drying medium in the duct 85 passes through a heater element 96 and into the upper drying chamber in a manner similar to that described with respect to FIGURE 2. The duct 83 has a heater element 97 disposed therein. A damper 98 is shown as controlling the drying chamber into which the drying medium passing through heating element 97 is actually injected. Each of the drying chambers covered by the duct 83 contains a damper, so that the particular point of injection of drying medium may be readily selected. If the flow path for the second portion of the second step is to be counter-current, the drying medium is injected adjacent the duct extension 82, flow passage being formed by the use of appropriate baffles with plates 15 and 18. The counter-current flow of this drying medium joins the counter-current flow of the drying medium injected through the duct 85 and is exhausted through the outlet 90. If co-current flow is desired in the second portion of the second drying step, the drying medium is injected farther upstream, by use of the appropriate damper, and a co-current flow path is provided by appropriate baffles to the exhaust duct extension 82. Thus, by the facility for selection of dampers, flexibility is achieved in the operation of the dryer, over such flexibility as has previously been available, with respect to operating conditions and tolerances for temperature and humidity.

It will, therefore, be understood that the invention utilizes a series of longitudinally disposed drying chambers. A belt passage is formed through the drying chambers so that the belt moves through a first portion and part of a second portion of the drying area in its outward movement from the foam applicator and through the remainder of the drying area during its return to the foam applicator. The actual drying is accomplished by utilization of a series of baffles which form the sides of the drying chambers. The baffle arrangement provides for a series of passes of the drying medium across and through the foam and belt. In addition, the baffle system provides for over-all longitudinal movement of the drying medium along the length of the drying chamber disposition. In actuality, the embodiment shown in FIGURE 1 utilizes three separate drying medium passages, with separate flow control means associated with each passage. In addition, the middle of the three passages is divided into three sub-parts, with separate control over drying medium flow for each sub-part. Thus, the length of each of the drying medium passages may be selected simply by adjusting the location of the inlet and exhaust. Such selection is readily performed by the use of the dampers. By variation in the structure and disposition of the baffles the ratio of drying medium passing through the foam craters and belt perforations to the drying medium by-passed therearound is selected. Thus, the present invention provides heretofore unavailable flexibility, economy and operating efficiency in the drying of foams.

The invention claimed is:
1. Apparatus for drying foam comprising:
a continuous perforated belt having a longitudinal edge,
means for moving the belt in a longitudinal path,
a drying chamber disposed around a portion of the belt,
means for applying foam to the belt external of the drying chamber,
means disposed adjacent the belt for forming craters in the foam,
means for directing a drying medium from a source vertically displaced from said longitudinal edge in a direction substantially normal to the direction of movement of the belt, and means for constricting the drying medium as it travels across the belt and for directing the drying medium substantially vertically through the belt and for increasing the constriction on the drying medium until substantially all the drying medium passes through the belt.

2. An improved method for drying foam deposited upon an endless perforated belt and having craters formed therein corresponding to belt perforations, comprising moving the belt and foam along a longitudinally planar path through a drying region, directing a drying medium from a source vertically displaced from one longitudinal edge in a direction substantially normal to the direction of movement of the belt, and constricting the drying medium as it travels across the belt and foam and passes substantially vertically through the belt and foam and increasing the constriction until substantially all the drying medium passes through the belt.

3. The method in accordance with claim 2 wherein drying medium is introduced at a plurality of locations spaced along the drying region, and is exhausted from the region at at least one point intermediate said spaced locations.

4. The method according to claim 3 in which drying medium is introduced at different temperatures at said plurality of locations.

5. The method according to claim 3 in which drying medium is introduced at different flow rates at said plurality of locations.

6. The method according to claim 2 in which a portion of the drying medium is recycled through temperature control units.

7. The method according to claim 2 in which the drying medium passing through the belt is returned to the opposite side of the belt and at a different portion thereof and is again forced to travel across and through the belt.

8. The method according to claim 2 wherein the drying medium is passed through the belt a plurality of times alternately upwardly and downwardly.

9. The method in accordance with claim 2 in which the drying medium is directed from alternate longitudinal edges of the belt across and through the belt in adjacent portions of the drying region.

10. In apparatus for drying foam including a continous perforated belt having parallel longitudinal edges, means for moving the belt in a longitudinal path, a drying chamber disposed around a portion of the belt and means for applying foam to the belt and for cratering the foam on the belt at each belt perforation, the improvement comprising;
(a) baffles disposed in the chamber to laterally divide the same into a plurality of longitudinally adjacent sections,
(b) means for introducing drying medium into the chamber at a plurality of spaced points vertically displaced from an edge of the belt,
(c) means including said baffles for causing drying medium from said sources to flow in a direction substantially normal to the direction of movement of the belt,
(d) the baffles being arranged to constrict the drying medium as it travels across the belt and for causing the drying medium to flow through the belt, and
(e) a plurality of outlets intermediate the plurality of inlets for exhausting drying medium from the chamber whereby the chamber is divided into a plurality of separate drying sections by the flow of drying medium from the several inlets to the exhausts.

11. Apparatus according to claim 10 in which flow control means are associated with at least a portion of the inlets and exhausts.

12. An improved method for drying a material which is spreadable upon an endless perforated belt which is of sufficiently stable structure as not to flow through the belt perforations, comprising moving the belt and material along a longitudinally planar path through a drying region, directing a drying medium from a source vertically displaced from one longitudinal edge in a direction substantially normal to the direction of movement of the belt, constricting the drying medium as it travels across the belt and material and passes substantially vertically through the belt perforations, and increasing the constriction until substantially all the drying medium passes through the belt.

References Cited by the Examiner

UNITED STATES PATENTS

| 2,513,368 | 7/1950 | Shabaker | 34—207 |
| 2,807,892 | 10/1957 | Gerrish | 34—208 |
| 2,981,629 | 4/1961 | Ginnette et al. | 99—206 |
| 3,102,795 | 9/1963 | Andrews et al. | 34—207 |
| 3,161,485 | 12/1964 | Buhrer | 34—20 X |

JOHN J. CAMBY, *Acting Primary Examiner.*

NORMAN YUDKOFF, WILLIAM F. O'DEA,
*Examiners.*

F. E. DRUMMOND, *Assistant Examiner.*